United States Patent
Shin et al.

(10) Patent No.: US 11,174,426 B2
(45) Date of Patent: Nov. 16, 2021

(54) COLOR CONVERSION FILM, AND BACKLIGHT UNIT AND DISPLAY APPARATUS COMPRISING SAME

(71) Applicant: LG CHEM, LTD., Seoul (KR)

(72) Inventors: Dong Mok Shin, Daejeon (KR); Nari Kim, Daejeon (KR); Byeong In Ahn, Daejeon (KR); Hyun Seong Ko, Daejeon (KR); Seijung Park, Daejeon (KR); Hye Mi Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 78 days.

(21) Appl. No.: 16/094,122

(22) PCT Filed: Apr. 13, 2017

(86) PCT No.: PCT/KR2017/004003
§ 371 (c)(1),
(2) Date: Oct. 16, 2018

(87) PCT Pub. No.: WO2017/183854
PCT Pub. Date: Oct. 26, 2017

(65) Prior Publication Data
US 2019/0093008 A1 Mar. 28, 2019

(30) Foreign Application Priority Data

Apr. 18, 2016 (KR) ........................ 10-2016-0047070

(51) Int. Cl.
*C09K 11/02* (2006.01)
*C09K 11/06* (2006.01)
(Continued)

(52) U.S. Cl.
CPC ............ *C09K 11/025* (2013.01); *B32B 27/08* (2013.01); *B32B 27/20* (2013.01); *C09K 11/06* (2013.01);
(Continued)

(58) Field of Classification Search
CPC combination set(s) only.
See application file for complete search history.

(56) References Cited

U.S. PATENT DOCUMENTS 6,337,536 B1 1/2002 Matsubara et al.
9,279,078 B2 3/2016 Yoshida et al.
(Continued)

FOREIGN PATENT DOCUMENTS

CN 101133684 2/2008
CN 102046667 5/2011
(Continued)

*Primary Examiner* — Anthony J Frost
(74) *Attorney, Agent, or Firm* — Dentons US LLP

(57) ABSTRACT

The invention described in the present specification relates to a color conversion film including: a color conversion layer which includes a resin matrix, and an organic fluorescent substance that is dispersed in the resin matrix, and emits light with a wavelength different from that of irradiated light when irradiated with light comprising a wavelength of 450 nm, in which the color conversion film includes a color shift compensation polymer, which allows a color difference change of white light emitted to be within 0.05 when an entire surface of the color conversion film is irradiated with blue light having a luminance of 600 nit at 60° C. for 1,000 hours, in the color conversion layer or in an additional layer disposed on the color conversion layer, a backlight unit including the same, and a display device including the same.

16 Claims, 6 Drawing Sheets

(51) Int. Cl.
  *G02B 5/23* (2006.01)
  *B32B 27/08* (2006.01)
  *B32B 27/20* (2006.01)
  *F21V 8/00* (2006.01)
  *G02F 1/13357* (2006.01)
  *G02F 1/1335* (2006.01)

(52) U.S. Cl.
  CPC .............. *G02B 5/23* (2013.01); *G02B 6/005* (2013.01); *B32B 2307/422* (2013.01); *B32B 2457/202* (2013.01); *C09K 2211/1007* (2013.01); *C09K 2211/1018* (2013.01); *G02B 6/0043* (2013.01); *G02F 1/133609* (2013.01); *G02F 1/133614* (2021.01); *G02F 2202/022* (2013.01); *Y02B 20/00* (2013.01)

(56) References Cited

U.S. PATENT DOCUMENTS

| | | |
|---|---|---|
| 2006/0284532 A1 | 12/2006 | Kurihara et al. |
| 2007/0090755 A1 | 4/2007 | Eida et al. |
| 2009/0179550 A1* | 7/2009 | Koo .................... H01L 51/5253 313/504 |
| 2011/0267714 A1 | 11/2011 | Makino et al. |
| 2012/0156436 A1* | 6/2012 | Kim .......................... B32B 3/30 428/172 |
| 2012/0301724 A1 | 11/2012 | Frauenrath et al. |
| 2013/0148057 A1* | 6/2013 | Kang ....................... C08K 9/08 349/64 |
| 2014/0054473 A1 | 2/2014 | Ren et al. |
| 2014/0204128 A1 | 7/2014 | Jiang |
| 2014/0356618 A1* | 12/2014 | Hosoda ................ C09D 133/04 428/336 |
| 2016/0017219 A1 | 1/2016 | Lub et al. |

FOREIGN PATENT DOCUMENTS

| | | |
|---|---|---|
| CN | 203025372 | 6/2013 |
| CN | 105144275 | 12/2015 |
| JP | 2001171175 | 6/2001 |
| JP | 2004265752 | 9/2004 |
| JP | 2011221376 | 11/2011 |
| JP | 2011241160 | 12/2011 |
| JP | 2011241160 A * | 12/2011 |
| KR | 10-2000-0011622 | 2/2000 |
| KR | 10-2006-0131649 | 12/2006 |
| KR | 10-2012-0067167 | 6/2012 |
| KR | 10-2013-0065608 | 6/2013 |
| KR | 10-2013-0074891 | 7/2013 |
| KR | 10-2014-0007840 | 1/2014 |
| KR | 10-2015-0089961 | 8/2015 |
| WO | 2006100957 | 9/2006 |
| WO | 2012042415 | 4/2012 |

* cited by examiner

[Figure 1]
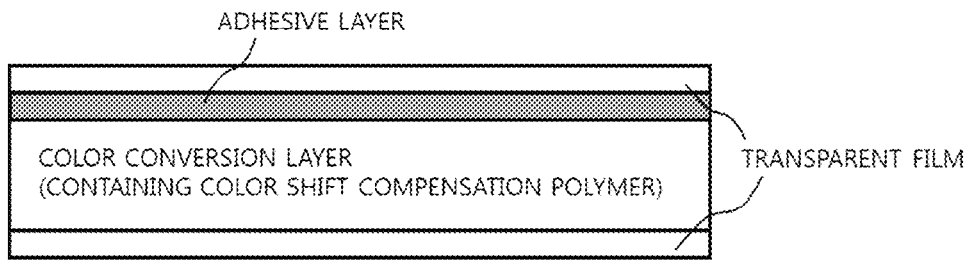
[Figure 2]
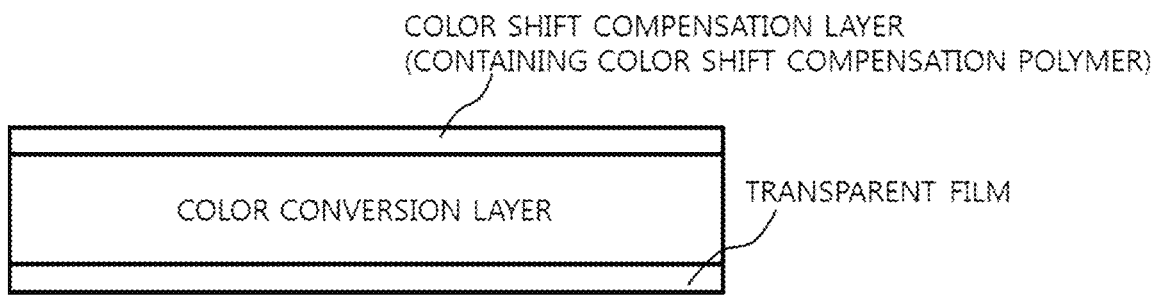
[Figure 3]
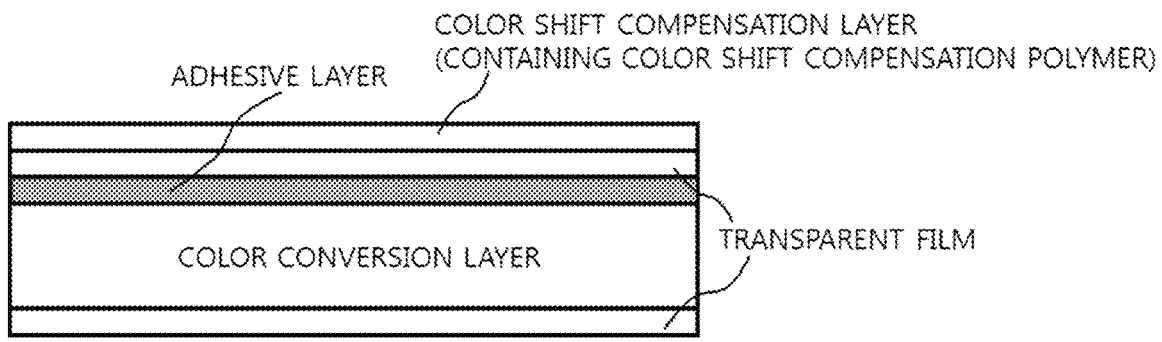

[Figure 4]
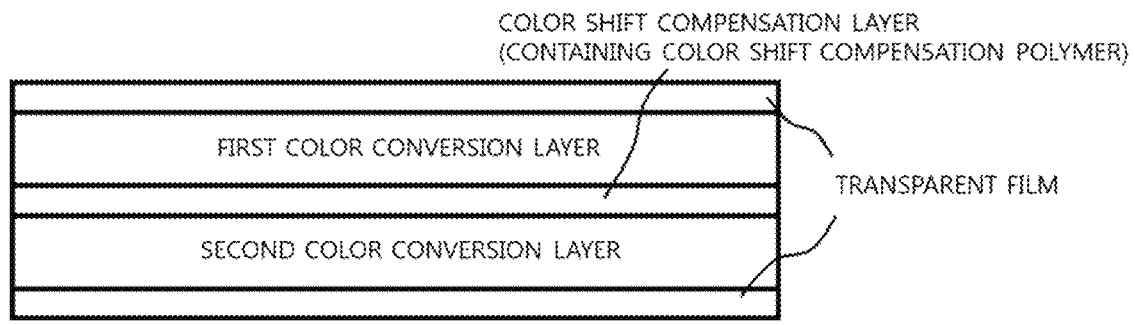
[Figure 5]
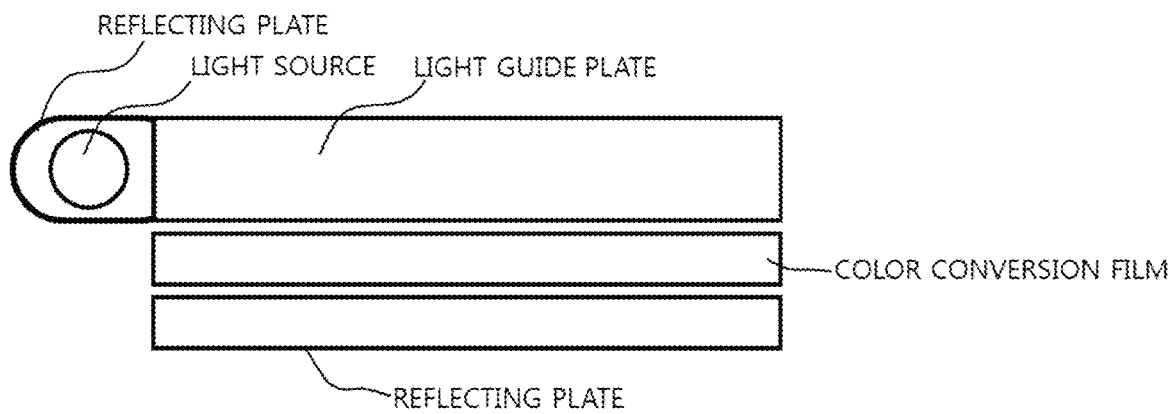
[Figure 6]
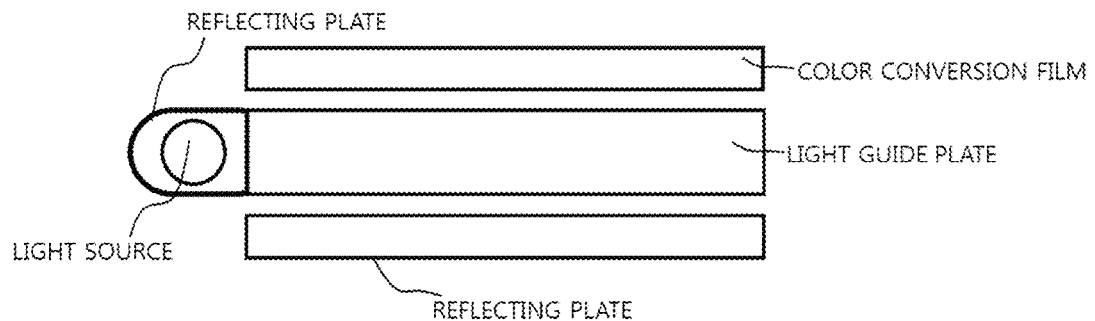

[Figure 7]
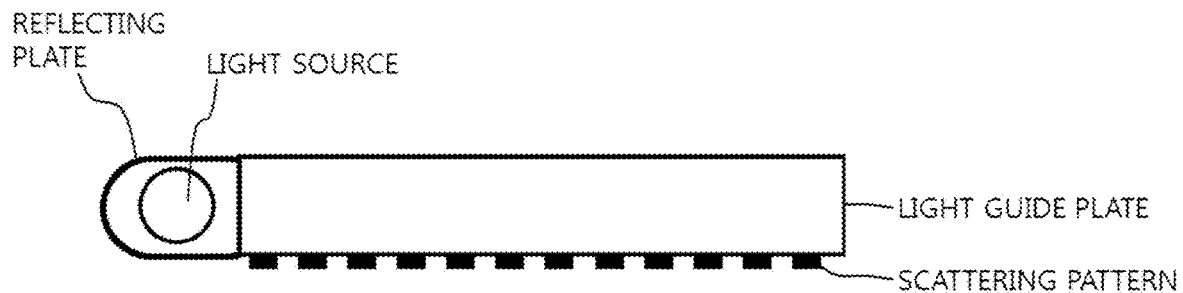
[Figure 8]
[Figure 9]
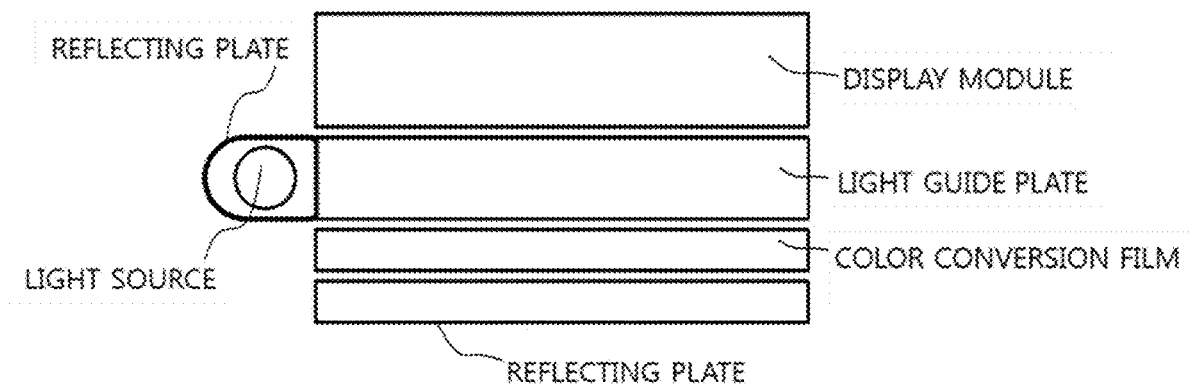

[Figure 10]
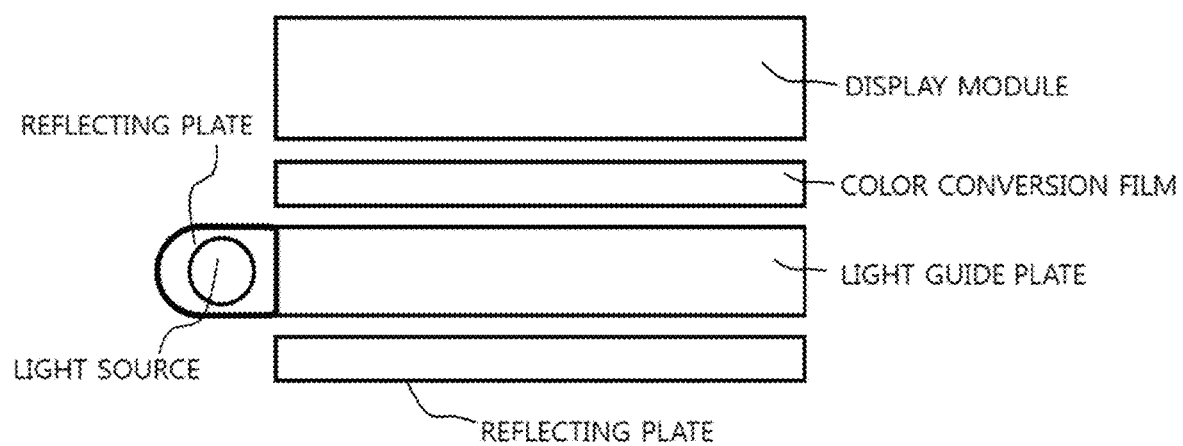

[Figure 11]
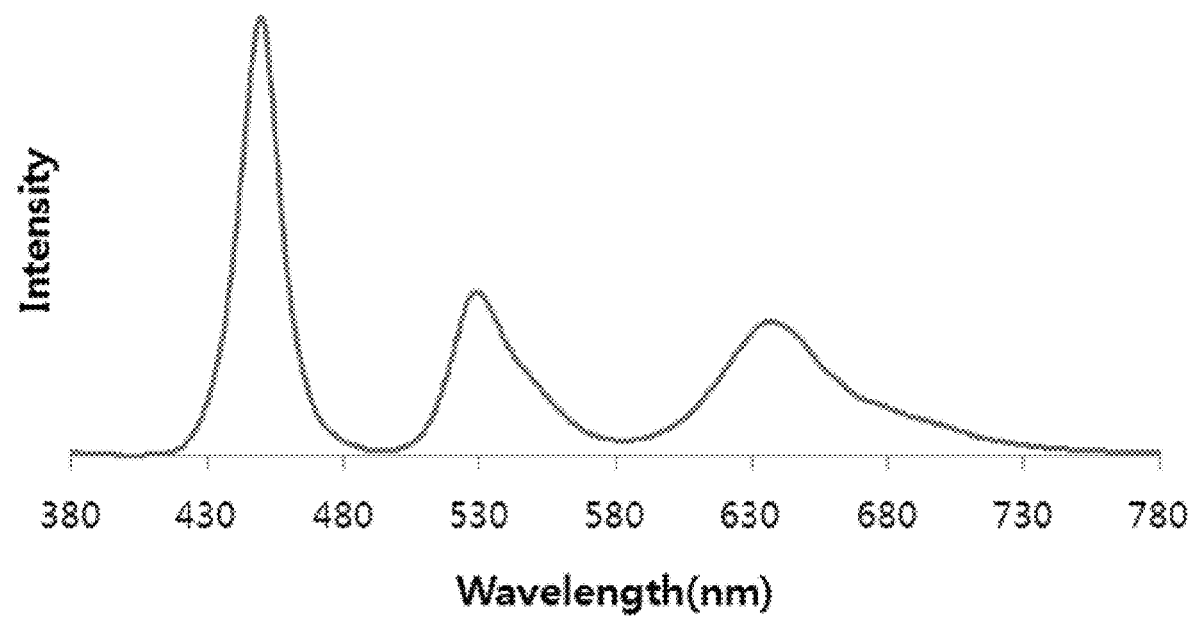
[Figure 12]
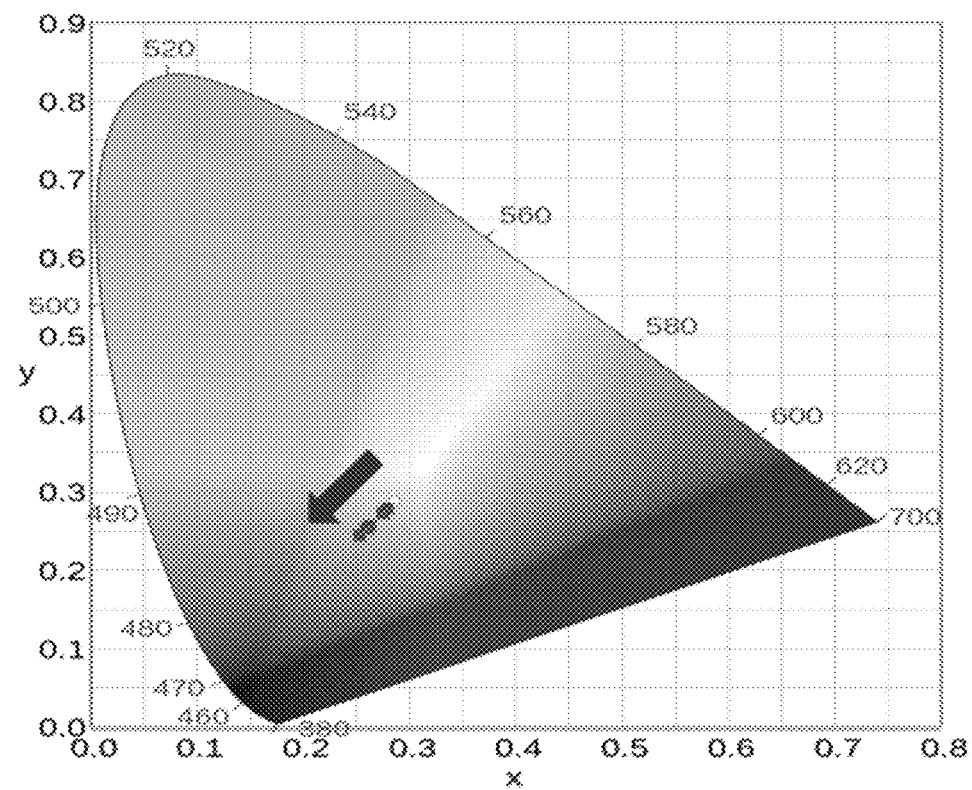

[Figure 13]
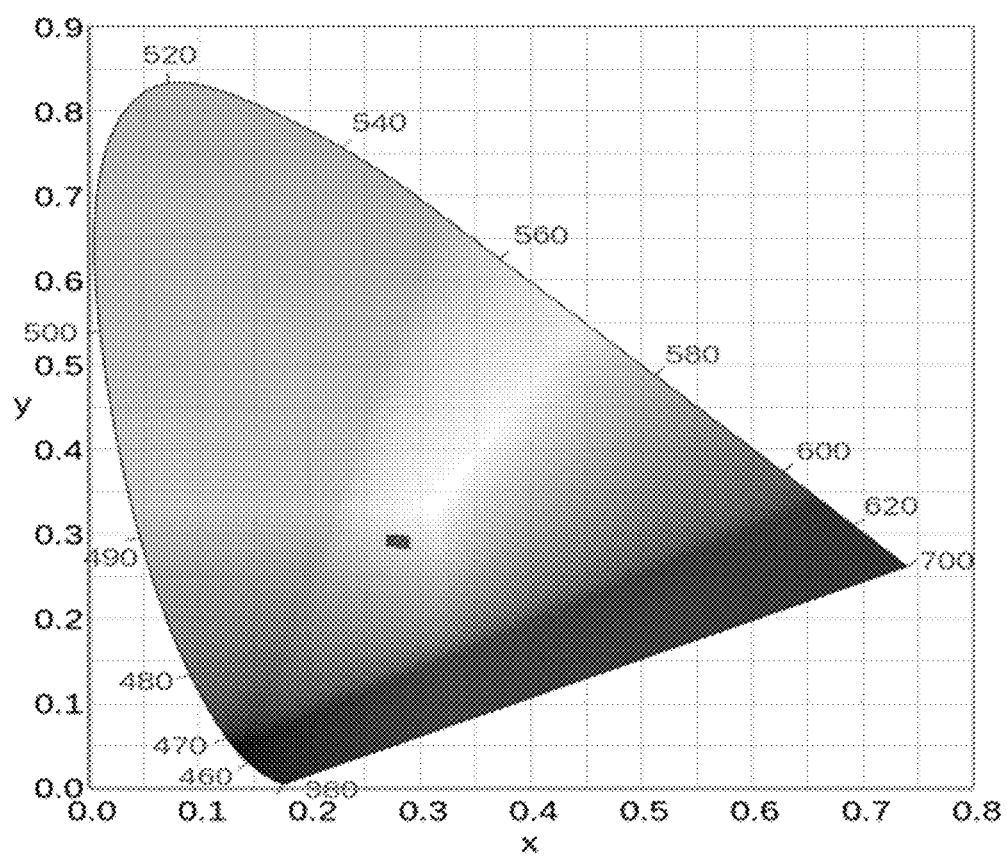

COLOR CONVERSION FILM, AND BACKLIGHT UNIT AND DISPLAY APPARATUS COMPRISING SAME

This application is a National Stage Application of International Application No. PCT/KR2017/004003 filed on Apr. 13, 2017, which claims priority to and the benefit of Korean Patent Application No. 10-2016-0047070 filed in the Korean Intellectual Property Office on Apr. 18, 2016, the entire contents of which are incorporated herein by reference in their entirety for all purposes as if fully set forth herein.

TECHNICAL FIELD

The present application relates to a color conversion film, and a backlight unit and a display device including the same.

BACKGROUND ART

As large screen televisions become more common, televisions are also becoming high-definition, slimmer and highly functional. Since high performance and high definition OLED TVs still have problems of price competitiveness, markets for the high performance and high definition OLED TVs have not yet begun in earnest. Accordingly, efforts to similarly secure advantages of OLEDs with LCDs have been continuously made.

As one of the efforts, many quantum dot-related technologies and prototypes have been recently implemented. However, cadmium-based quantum dots have safety problems such as restrictions on the use, and therefore, interests in manufacturing backlights using quantum dots without cadmium, which has relatively no safety issues, have been rising.

DETAILED DESCRIPTION OF THE INVENTION

Technical Problem

The present application has been made in an effort to provide a color conversion film, and a backlight unit and a display device including the same.

Technical Solution

An exemplary embodiment of the present application a color conversion film including: a color conversion layer; and a color shift compensation layer, in which the color conversion layer includes a resin matrix, and an organic fluorescent substance which is dispersed in the resin matrix and emits light with a wavelength different from that of irradiated light when irradiated with light including a wavelength of 450 nm, and the color shift compensation layer includes a color shift compensation polymer which allows a color difference change of white light emitted to be 0.05 or less when an entire surface of the color conversion film is irradiated with blue light having a luminance of 600 nit at 60° C. for 1,000 hours.

Here, the irradiation of the entire surface of the color conversion film with blue light means irradiating the entire surface of the color conversion film with blue light emitted from a light source by converting the blue light into a surface light source through a stack structure of a backlight unit including a light guide plate, a light collecting film, and a brightness enhancement film.

The blue light means light including light having a wavelength of 450 nm. According to an Example, the blue light may have a maximum light emission peak of 450 nm.

According to another exemplary embodiment, the transmittance decrease rate of the color shift compensation polymer with respect to light having a wavelength of 450 nm satisfies Equation $[T_{@450\ nm}(\%) = T_{@450\ nm\text{-}int}(\%) - ax\ (time)]$, and in this case, a is a constant to adjust a white coordinate. The transmittance decrease rate may be measured by a method of driving a backlight unit to which the color conversion film including the color shift compensation polymer is applied, and measuring the transmittance decrease ratio by measuring the transmittance at 450 nm according to the driving time.

According to an Example, when the color shift compensation polymer is exposed to blue light, the transmittance of the blue light may be defined as a yellowing polymer which is yellowed in inverse proportion to the exposure time.

According to still another exemplary embodiment of the present application, the color conversion film may further include a transparent film which is disposed on at least one surface thereof. The transparent film is brought into direct contact with the color conversion film, or is attached thereto through an adhesive layer.

Yet another exemplary embodiment of the present application provides a backlight unit including the color conversion film.

Still yet another exemplary embodiment of the present application provides a display device including the backlight unit including the color conversion film.

Advantageous Effects

According to an exemplary embodiment of the present application, brightness and color gamut are excellent, a manufacturing process is simple, and manufacturing costs are lowered by including an organic fluorescent substance in a color conversion film, as compared to the case of applying an inorganic fluorescent substance or a quantum dot material.

When an organic fluorescent substance included in a color conversion film is degraded, the amount of light, which is absorbed by the fluorescent substance in light irradiated from a light source of a backlight unit, is decreased, and accordingly, the spectrum of mixed light, in which light emitted from the light source and light converted by the color conversion film are mixed, is changed. According to exemplary embodiments described in the present specification, by using a color shift compensation polymer, which has a characteristic that light transmittance of blue light (450 nm) is decreased according to exposure time when receiving light irradiated from a light source of a backlight unit, it is possible to minimize a change in spectrum of mixed light, in which the light emitted from the light source and light converted by the color conversion film are mixed, even when a fluorescent substance is degraded as described above. Therefore, even when a display is driven for a long period of time, the service life of the display may be prolonged by preventing color sense from being distorted as compared to the initial phase thereby.

BRIEF DESCRIPTION OF DRAWINGS

FIGS. 1 to 4 illustrate a cross-section of a color conversion film according to exemplary embodiments of the present application.

FIGS. 5 and 6 illustrate a backlight unit according to exemplary embodiments of the present application.

FIGS. 7 and 8 illustrate a scattering pattern provided in a light guide plate of a backlight unit according to exemplary embodiments of the present application.

FIGS. 9 and 10 illustrate a display device according to exemplary embodiments of the present application.

FIG. 11 illustrates a light emission spectrum of a backlight unit manufactured in an Example.

FIGS. 12 and 13 illustrate a color difference over time in a Comparative Example and the Example, respectively.

BEST MODE

A color conversion film according to an exemplary embodiment of the present application includes a color conversion layer which includes a resin matrix, and a an organic fluorescent substance which is dispersed in the resin matrix and emits light with a wavelength different from that of irradiated light when irradiated with light including a wavelength of 450 nm. Here, the color conversion film is characterized by including, in the color conversion layer or in an additional layer disposed on at least one surface of the color conversion layer, a color shift compensation polymer which allows a color difference change of white light emitted to be within 0.05 when an entire surface of the color conversion film is irradiated at 60° C. for 1,000 hours with blue light having a luminance of 600 nit which is emitted from a light source and converted into a surface light source through a stack structure of a backlight unit including a light guide plate, a light collecting film such as a prism sheet, and a brightness enhancement film.

According to an exemplary embodiment of the present application, the color difference change means a color difference in a specific time (t), and may be obtained through Equation [sqrt((Wx(t)−Wx(Initial phase))$^2$+(Wy(t)−Wy(Initial phase))$^2$)]. In this case, Wx(t), Wx(Initial phase), Wy(t), and Wy (Initial phase) mean an x value of a white coordinate after a specific time (t) passes, an x value of the white coordinate in the initial phase, a y value of the white coordinate after the specific time (t) passes, and a y value of the white coordinate in the initial phase, respectively.

Here, the irradiation of the entire surface of the color conversion film with blue light means irradiating the entire surface of the color conversion film with blue light which is emitted from a light source and converted into a surface light source through a stack structure of a backlight unit including a light guide plate, a light collecting film such as a prism sheet, and a brightness enhancement film such as DBEF or APF. The blue light passing through the stack structure of the backlight unit is uniformly emitted at the entire surface of the backlight unit, and in this case, the luminance of 600 nit adds the same energy into the entire area of the color conversion film. The backlight unit may be an edge-type (edge lit) system.

According to an example, the blue light has a light emission peak at 450 nm and has a full width at half maximum of 30 nm or less. The full width at half maximum means a width of a light emission peak when light emitted from the film has a height which is half the maximum height at the maximum light emission peak of the light. The full width at half maximum may be measured in a film state. The blue light may be light whose light emission strength distribution is monomodal.

In an exemplary embodiment of the present application, the color shift compensation polymer is included in an additional layer disposed on at least one surface of the color conversion layer, and the additional layer includes the color shift compensation polymer in an amount of 10 to 100 wt %. That is, the color shift compensation polymer may be included in an amount of 10 to 100 wt % based on the total weight of the additional layer.

When one member is "disposed on one surface" of another member in the present specification, this includes not only a case where one member is brought into contact with another member, but also a case where still another member is present between the two members. For example, in an exemplary embodiment of the present application, the including of a color shift compensation polymer in an additional layer disposed on at least one surface of the color conversion layer includes not only a case where the additional layer including the color shift compensation polymer is disposed to be brought into direct contact with the color conversion layer, but also a case where another member is disposed between the color conversion layer and the additional layer including the color shift compensation polymer.

That is, according to an exemplary embodiment of the present application, the color shift compensation layer need not be brought into contact with the color conversion layer, and still another layer may be disposed between the color conversion layer and the color shift compensation layer, if necessary. For example, as still another layer disposed between the color conversion layer and the color shift compensation layer, for example, a brightness enhancement film such as a double brightness enhancement film (DBEF) or an advanced polarizer film (APF) and/or a light collecting film such as a prism sheet may be disposed.

In an exemplary embodiment of the present application, a color shift compensation layer means an additional layer including the color shift compensation polymer.

In an exemplary embodiment of the present application, the color conversion layer and the color shift compensation layer may be each disposed in the form of a film.

According to another exemplary embodiment, a light source may be disposed between the color conversion layer and the color shift compensation layer.

According to an example of the present specification, the color shift compensation polymer allows a color difference change of white light emitted to be 0.05 or less when an entire surface of a color conversion film is irradiated with blue light having a luminance of 600 nit, which is converted into a surface light source, at 60° C. for 1,000 hours as described above.

The color shift compensation polymer is a polymer including at least one of the structures such as benzene, methyl benzene, chlorobenzene, nitrobenzene, phenol, aniline, benzoic acid, anisole, xylene, furan, benzofuran, pyrrole, indole, imidazole, oxazole, thiophene, benzothiophene, benzimidazole, indazole, benzoxazole, isobenzofuran, isoindole, purine, benzothiophene, naphthalene, pyridine, quinoline, triazine, and benzotriazine, and particularly, it is possible to use an epoxy resin such as polyamide, a bisphenol A epoxy resin, a bisphenol F epoxy resin, a bisphenol S epoxy resin, and a novolac epoxy resin; a urethane resin including an aromatic ring, such as toluene diisocyanate (TDI), methylene diphenyl diisocyanate (MDI), xylene diisocyanate (XDI) metatetramethylxylene diisocyanate (TMXDI), naphthalene 1,5-diisocyanate (NDI), hydrogenated xylene diisocyanate (HXDI), p-phenylene diisocyanate (PPDI), and 4,4'-dibenzyl diisocyanate (DBDI); polyvinylidene fluoride (PVDF); polyvinylidene chloride (PVDC), and the like.

According to still another exemplary embodiment of the present application, the color shift compensation polymer may be included in the color conversion layer. When the color shift compensation polymer is included in the color conversion layer (FIG. 1), the color shift compensation polymer may be included in a content of 1 to 50 wt % based on the total weight of the color conversion layer.

According to still yet another exemplary embodiment of the present application, the color shift compensation layer may be composed of a color shift compensation polymer alone, and may be composed of a color shift compensation polymer and another UV-curable resin or thermoplastic resin, if necessary. A color shift compensation polymer may be included in an amount of 10 to 100 wt % in the color shift compensation layer.

The color shift compensation layer may be manufactured by forming a color shift compensation layer on a transparent base material, and then integrally laminating the color shift compensation layer on an outermost portion of a color conversion film by means of an adhesive layer (FIG. 3), or may be manufactured by directly coating or stacking a color shift compensation polymer on an outer portion of a color conversion layer (FIG. 2). Further, when two or more color conversion layers are stacked, for example, when a color conversion layer which converts blue light into green light and a color conversion layer which converts green or blue light into red light are stacked, the color shift compensation layer may be disposed between the stacked color conversion layers (FIG. 4). In addition, the color shift compensation layer may also be formed by using a method of coating the color shift compensation layer onto a transparent base material or a solution casting method, and may also be obtained as a color shift compensation layer alone through extrusion and stretching without a base material. The color shift compensation layer has preferably a small thickness, for example, a thickness of 1 μm to 200 μm.

In the present application, a color shift compensation layer means a layer including a color shift compensation polymer.

According to a further exemplary embodiment of the present application, a transparent film may be disposed on one surface or both surfaces of the color shift compensation layer. For example, when the color shift compensation layer is coated onto one surface of a color conversion layer by a casting method, a transparent film may be disposed on both surfaces thereof.

According to another further exemplary embodiment of the present application, a transparent film is disposed on at least one surface of the color conversion layer. The transparent film is brought into direct contact with the color conversion layer, or is attached thereto through an adhesive layer. When the color conversion film is manufactured by coating a composition for forming a color conversion layer on one surface of a transparent film, a separate adhesive layer may not be disposed between the transparent film and the color conversion layer. FIGS. 1 and 3 illustrate an example in which a transparent film is disposed on one surface of a color conversion layer, and a transparent film is disposed on the other surface of the color conversion layer through an adhesive layer.

The transparent film may function as a support when a color conversion layer is manufactured, and may also function as a protective film for preventing a color conversion layer from being curled. The type of transparent film is not particularly limited, and the material or thickness of the transparent film is not limited as long as the transparent film is transparent and may function as the support or the protective film. Here, transparency means that the transmittance of visible light is 70% or more. For example, as the transparent film, a PET film may be used. If necessary, as the transparent film, a barrier film may also be used. As the barrier film, those known in the art may be used.

The adhesive layer is used in order to attach a transparent film onto a color conversion film. As long as the aforementioned object is not damaged, the adhesive layer may be formed by using a material known in the art. For example, an adhesive layer may be formed by using an adhesive tape, or coating an adhesive composition.

According to an exemplary embodiment of the present application, a thermoplastic polymer or a thermosetting polymer may be used as a resin matrix of a color conversion layer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (TPU)-based material, a styrene-acrylonitrile (SAN)-based material, a polyvinylidene fluoride (PVDF)-based material, a modified-polyvinylidene fluoride (modified-PVDF)-based material, a styrene-ethylene-butylene-styrene (SEBS)-based material, a hydrogenated styrene-ethylene-butylene-styrene (hydrogenated SEBS)-based material, and the like. Since thermoplastic or thermosetting polymers do not use UV energy produced during a UV curing process, and have no radicals or positive ions capable of attacking a fluorescent substance as compared to UV curable resins, the thermoplastic or thermosetting polymers may prevent a deterioration in light characteristics by UV energy or radicals or positive ions.

In general, when a quantum dot material or an inorganic fluorescent substance is used in a color conversion film, there is a problem with stability of the color conversion film due to the reaction with water or oxygen, and there is a problem in that production unit costs are high. Therefore, studies have been conducted on a color conversion film to which an organic fluorescent substance having excellent brightness and color gamut, simple manufacturing processes, and low manufacturing costs is applied. However, the organic fluorescent substance has a problem in that a white color difference may occur due to the deterioration in durability, and it is possible to more efficiently prevent the color difference as described above by using the organic fluorescent substance with the color shift compensation polymer according to the present invention.

That is, with respect to a problem occurring due to the degradation of an organic fluorescent substance included in a color conversion film, even when the fluorescent substance is degraded as described above, a color conversion film according to an exemplary embodiment of the present invention may minimize a change in spectrum of mixed light, in which light emitting from a light source and light converted by the color conversion film are mixed, by using a color shift compensation polymer having a characteristic that light transmittance of blue light (450 nm) is decreased according to exposure time when light irradiated from a light source of a backlight unit is received. Accordingly, even when a display is driven for a long period of time, the service life of the display may be prolonged by preventing color sense from being distorted as compared to the initial phase thereby.

In this regard, when an inorganic fluorescent substance or a quantum dot material is used instead of an organic fluorescent substance, the problem-solving principle according to the application of a color shift prevention polymer described in the present application is not applied because the above-described advantages of the organic fluorescent substance cannot be obtained, and a peculiar problem occurring during the use of the organic fluorescent substance, that is, a white color difference does not occur. Rather, in a color conversion film including a color conversion layer including an inorganic fluorescent substance or a quantum dot material, when a color shift compensation polymer is included in the color conversion layer on at least one surface of the color conversion layer, a color difference due to the color shift prevention polymer may occur unlike an organic fluorescent substance, thereby causing a change in light spectrum.

In the present application, the white color difference means that a white coordinate exhibits a color shift according to the time during a continuous irradiation with blue light.

According to an exemplary embodiment of the present application, the organic fluorescent substance is not particularly limited as long as the organic fluorescent substance is a fluorescent substance emitting light with a wavelength different from that of irradiated light when the organic fluorescent substance is irradiated with light including a wavelength of 450 nm. The emission of light having a wavelength different from that of irradiated light means a case where the wavelength of irradiated light need not be overlapped with the wavelength of emitted light at all, and the entire wavelength of irradiated light does not coincide with that of emitted light, and also includes a case where only a portion of the wavelength of irradiated light is different from the wavelength of emitted light. As the organic fluorescent substance, those known in the art may be used.

According to an example, as an organic fluorescent substance, it is possible to use a fluorescent substance which emits light with a wavelength different from light irradiated when the fluorescent substance is irradiated with light including a wavelength of 450 nm. For example, as the organic fluorescent substance, it is possible to use a fluorescent substance which has a light emission peak at 450 nm and a full width at half maximum of 40 nm or less and emits light with a wavelength different from that of irradiated light when the fluorescent substance is irradiated with light whose light emission strength distribution is monomodal. Here, the emitted light may be green light having a wavelength selected from a wavelength of 500 nm to 560 nm or red light having a wavelength selected from a wavelength of 600 nm to 780 nm, or a mixture thereof. For example, the organic fluorescent substance may include a fluorescent substance which emits red light by absorbing blue light or green light, a fluorescent substance which emits green light by absorbing blue light, or a mixture thereof.

In the present application, for the blue light, the green light, and the red light, the definitions known in the art may be used, and for example, the blue light is light having a wavelength selected from a wavelength of 400 nm to 500 nm, the green light is light having a wavelength selected from a wavelength of 500 nm to 560 nm, and the red light is light having a wavelength selected from a wavelength of 600 nm to 780 nm. In the present application, a green fluorescent substance absorbs at least a portion of blue light to emit green light, and a red fluorescent substance absorbs at least a portion of blue light or green light to emit red light. For example, the red fluorescent substance may also absorb not only blue light but also light having a wavelength of 500 nm to 600 nm.

According to an example, as the organic fluorescent substance, an organic fluorescent substance of the following Chemical Formula 1 may be used.

[Chemical Formula 1]

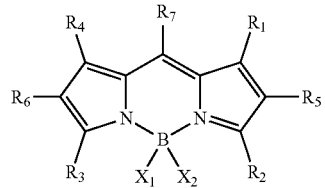

In Chemical Formula 1, $X_1$ and $X_2$ are the same as or different from each other, and are each independently a fluorine group or an alkoxy group, $R_1$ to $R_4$ are the same as or different from each other, and are each independently hydrogen, a halogen group, an alkyl group, an alkoxy group, an alkyl group substituted with a carboxyl group, an aryl group unsubstituted or substituted with an alkoxy group, —COOR, or an alkyl group substituted with —COOR, and R is an alkyl group, $R_5$ and $R_6$ are the same as or different from each other, and are each independently hydrogen, a cyano group, a nitro group, an alkyl group, an alkyl group substituted with a carboxyl group, —SO$_3$Na, or an aryl group unsubstituted or substituted with an arylalkynyl group, $R_1$ and $R_5$ may be linked to each other to form a substituted or unsubstituted hydrocarbon ring or a substituted or unsubstituted hetero ring, and $R_4$ and $R_6$ may be linked to each other to form a substituted or unsubstituted hydrocarbon ring or a substituted or unsubstituted hetero ring, and $R_7$ is hydrogen; an alkyl group; a haloalkyl group; or an aryl group unsubstituted or substituted with a halogen group, an alkyl group, an alkoxy group, an aryl group or an alkylaryl group.

According to an exemplary embodiment, $R_1$ to $R_4$ of Chemical Formula 1 are the same as or different from each other, and are each independently hydrogen, a fluorine group, a chlorine group, an alkyl group having 1 to 6 carbon atoms, an alkoxy group having 1 to 6 carbon atoms, an alkyl group having 1 to 6 carbon atoms substituted with a carboxyl group, an alkyl group having 1 to 6 carbon atoms substituted with carboxylic acid, an aryl group having 6 to 20 carbon atoms unsubstituted or substituted with an alkoxy group having 1 to 6 carbon atoms, —COOR, or an alkyl group having 1 to 6 carbon atoms substituted with —COOR, and R is an alkyl group having 1 to 6 carbon atoms.

According to another exemplary embodiment, $R_1$ to $R_4$ of Chemical Formula 1 are the same as or different from each other, and are each independently hydrogen, a chlorine group, a methyl group, an ethyl group substituted with a carboxyl group, a methoxy group, a phenyl group, a phenyl group substituted with a methoxy group, or a methyl group substituted with —COOR, and R is an alkyl group having 1 to 6 carbon atoms.

According to an exemplary embodiment, $R_5$ and $R_6$ of Chemical Formula 1 are the same as or different from each other, and are each independently hydrogen, a nitro group, an alkyl group having 1 to 6 carbon atoms, an alkyl group having 1 to 6 carbon atoms substituted with a carboxyl group, or —SO$_3$Na.

According to an exemplary embodiment, $R_5$ and $R_6$ of Chemical Formula 1 are the same as or different from each other, and are each independently hydrogen, a nitro group; an ethyl group, an ethyl group substituted with a carboxyl group, or —SO$_3$Na.

According to an exemplary embodiment, $R_7$ of Chemical Formula 1 is hydrogen; an alkyl group having 1 to 6 carbon atoms; or an aryl group having 6 to 20 carbon atoms unsubstituted or substituted with an alkyl group having 1 to 6 carbon atoms, an alkoxy group having 1 to 6 carbon atoms, an aryl group having 6 to 20 carbon atoms or an alkylaryl group having 7 to 20 carbon atoms.

According to an exemplary embodiment, $R_7$ of Chemical Formula 1 is hydrogen, methyl, ethyl, propyl, butyl, pentyl, phenyl, methylphenyl, dimethylphenyl, trimethylphenyl, naphthyl, naphthyl substituted with biphenyl, naphthyl substituted with dimethylfluorene, dimethylphenyl substituted with terphenyl, methoxyphenyl, or dimethoxyphenyl. According to an exemplary embodiment, Chemical Formula 1 may be represented by the following structural formulae.

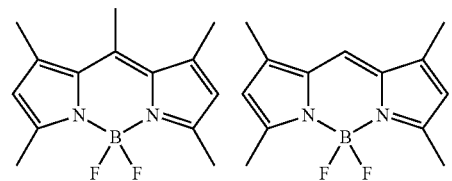

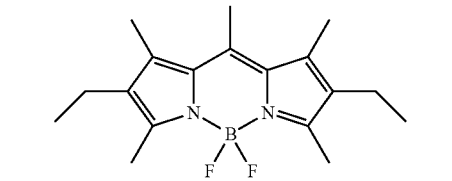

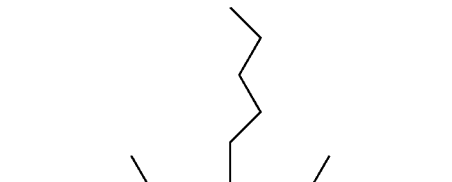

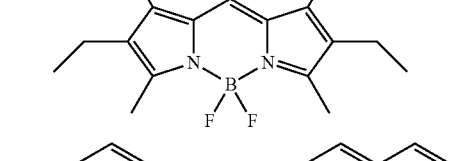

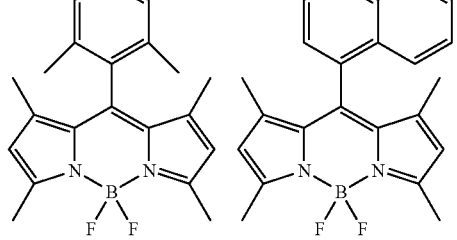

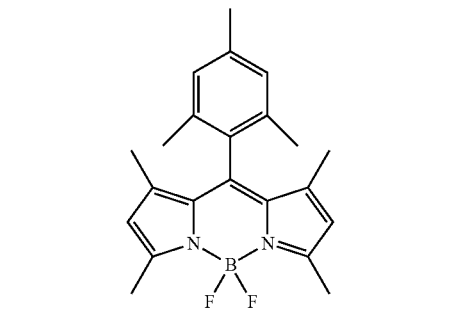

-continued

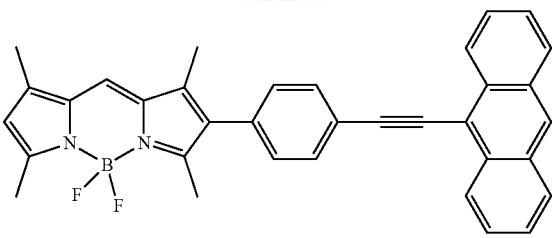

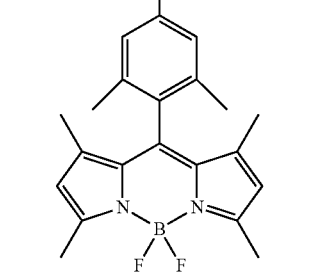

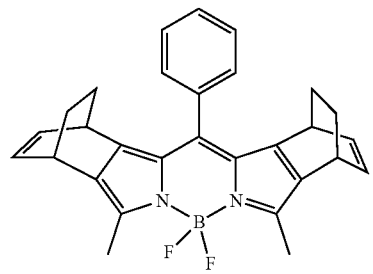

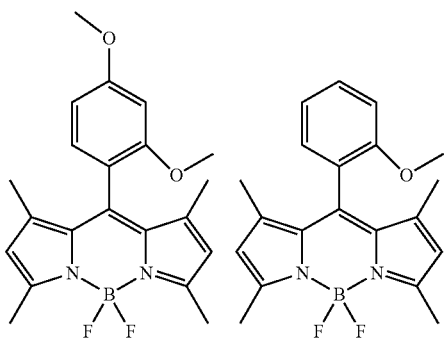

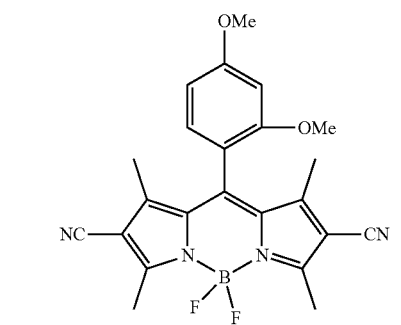

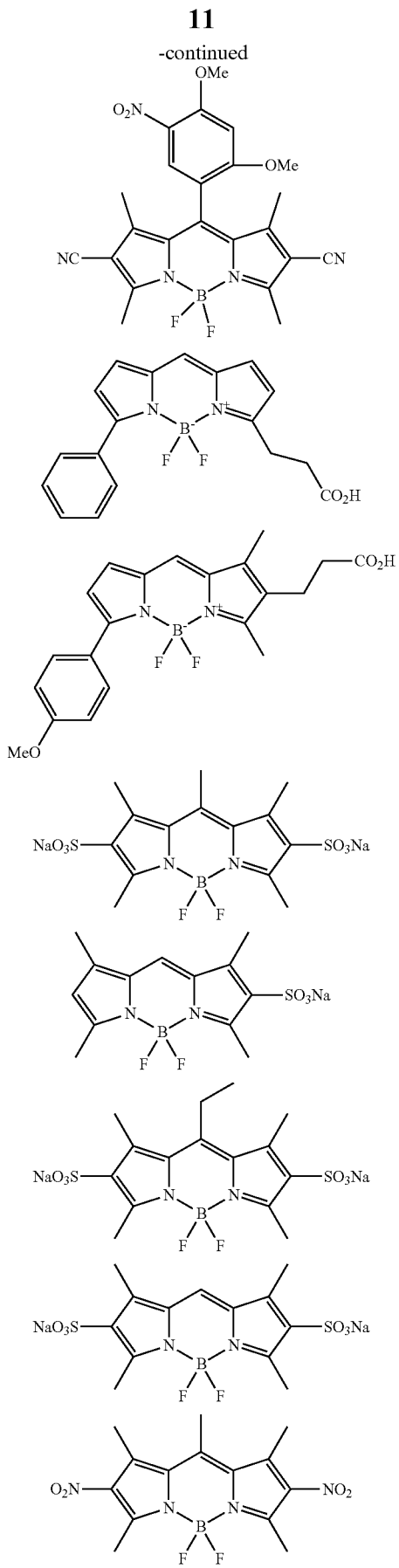
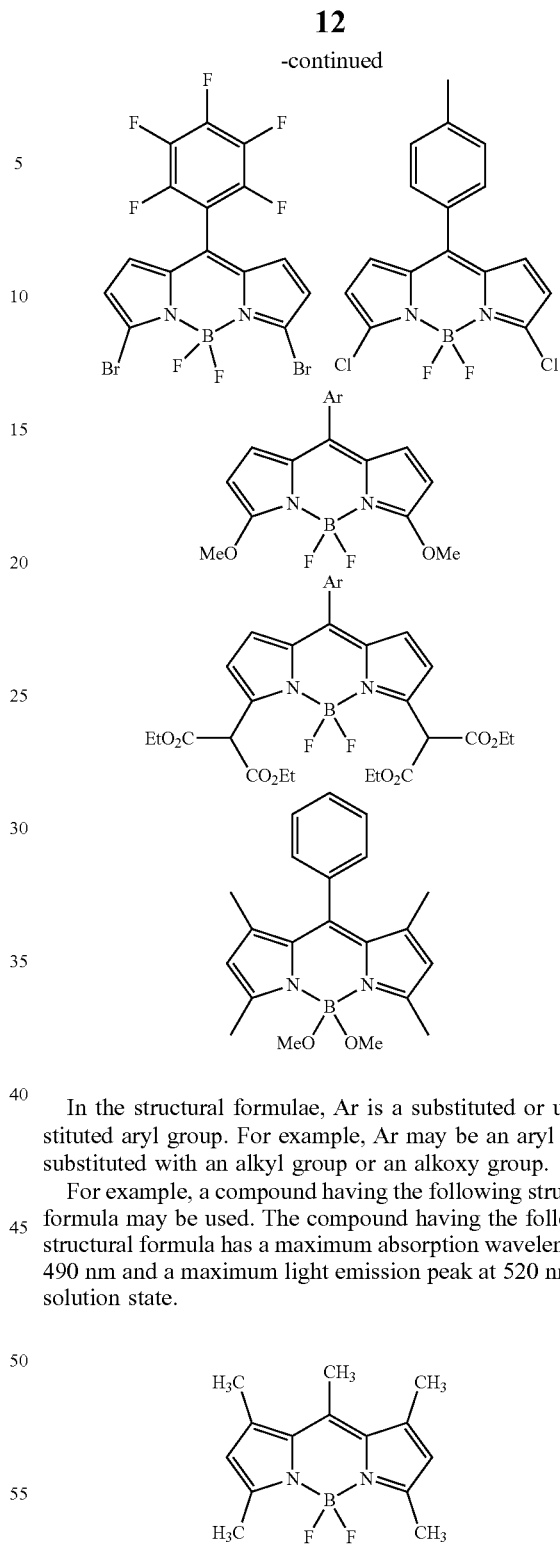

In the structural formulae, Ar is a substituted or unsubstituted aryl group. For example, Ar may be an aryl group substituted with an alkyl group or an alkoxy group.

For example, a compound having the following structural formula may be used. The compound having the following structural formula has a maximum absorption wavelength at 490 nm and a maximum light emission peak at 520 nm in a solution state.

However, the compound is not limited to the structural formula, and various organic fluorescent substances may be used.

According to another example, a fluorescent substance having a maximum absorption wavelength at 560 nm to 620 nm and a light emission peak at 600 nm to 650 nm in a solution state may be used as the organic fluorescent substance. For example, a compound of the following Chemical Formula 2 may be used.

[Chemical Formula 2]

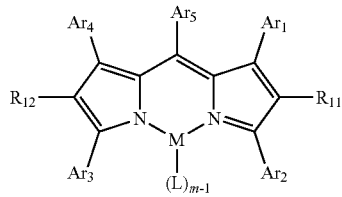

$R_{11}$, $R_{12}$, and L are the same as or different from each other, and are each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heterocyclic group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group, or a siloxanyl group, or are linked to an adjacent substituent to form a substituted or unsubstituted aromatic or aliphatic hydrocarbon or hetero ring, M is a m-valent metal, and is boron, beryllium, magnesium, chromium, iron, nickel, copper, zinc or platinum, and $Ar_1$ to $Ar_5$ are the same as or different from each other, and are each independently hydrogen; an alkyl group; a haloalkyl group; an alkylaryl group; an amine group; an arylalkenyl group unsubstituted or substituted with an alkoxy group; or an aryl group unsubstituted or substituted with a hydroxy group, an alkyl group or an alkoxy group.

According to an exemplary embodiment, Chemical Formula 2 may be represented by the following structural formulae.

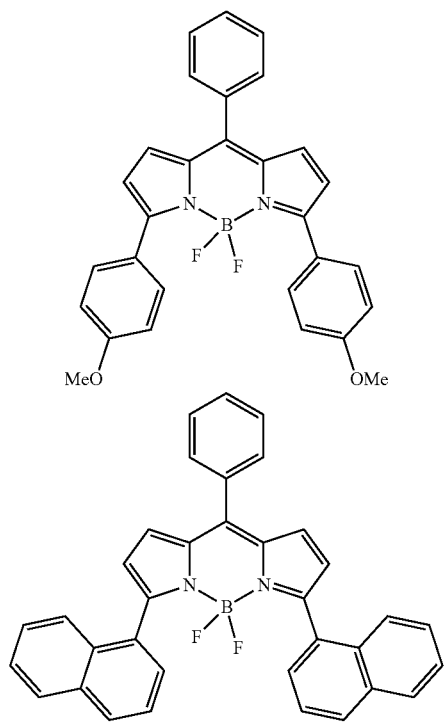

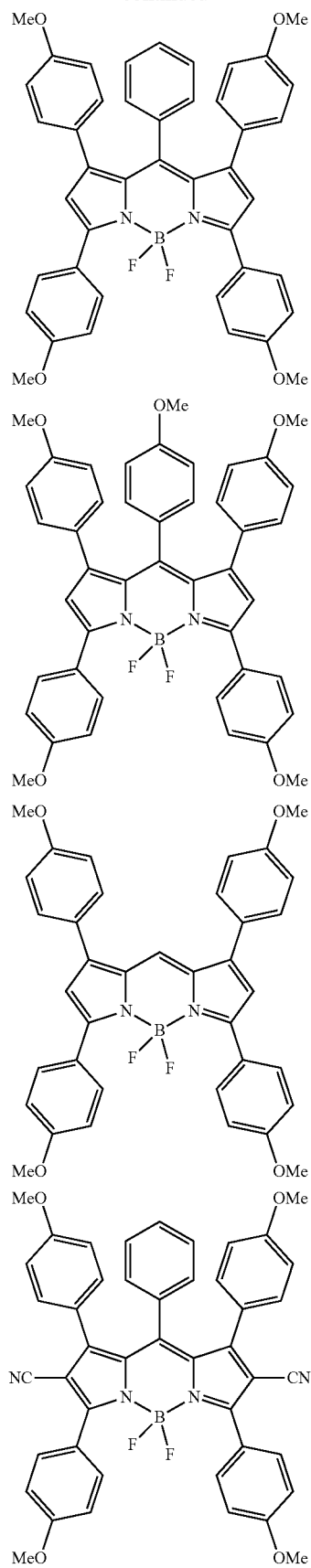

15
-continued
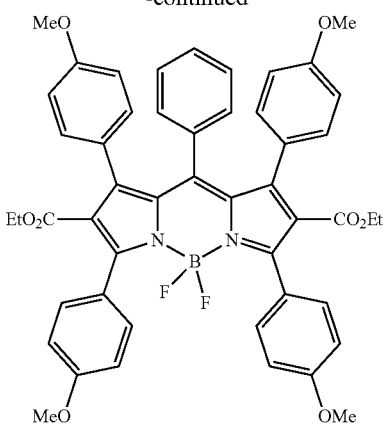
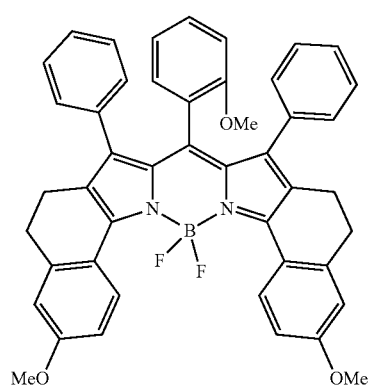
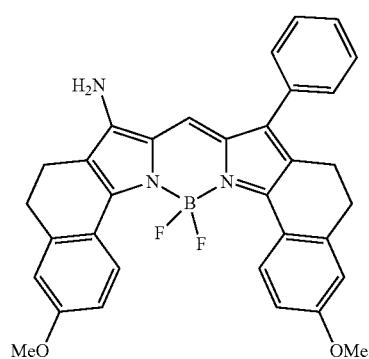
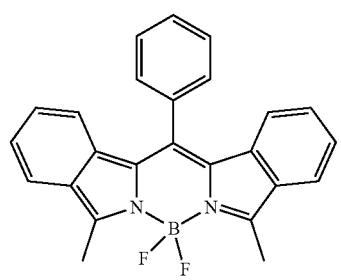
16
-continued
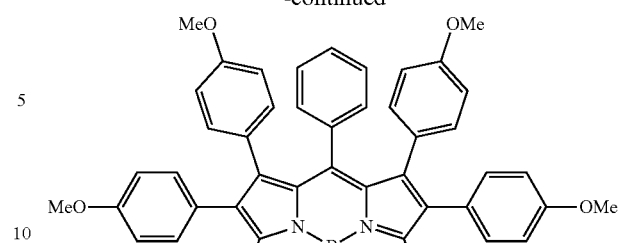
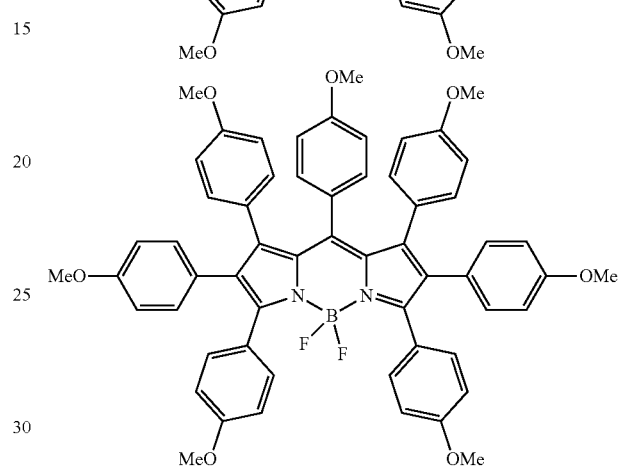
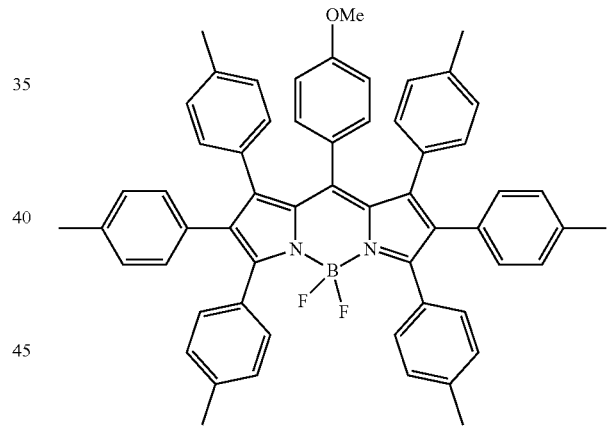
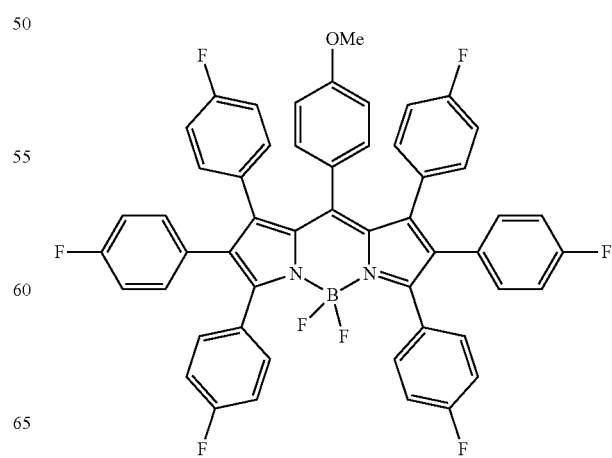

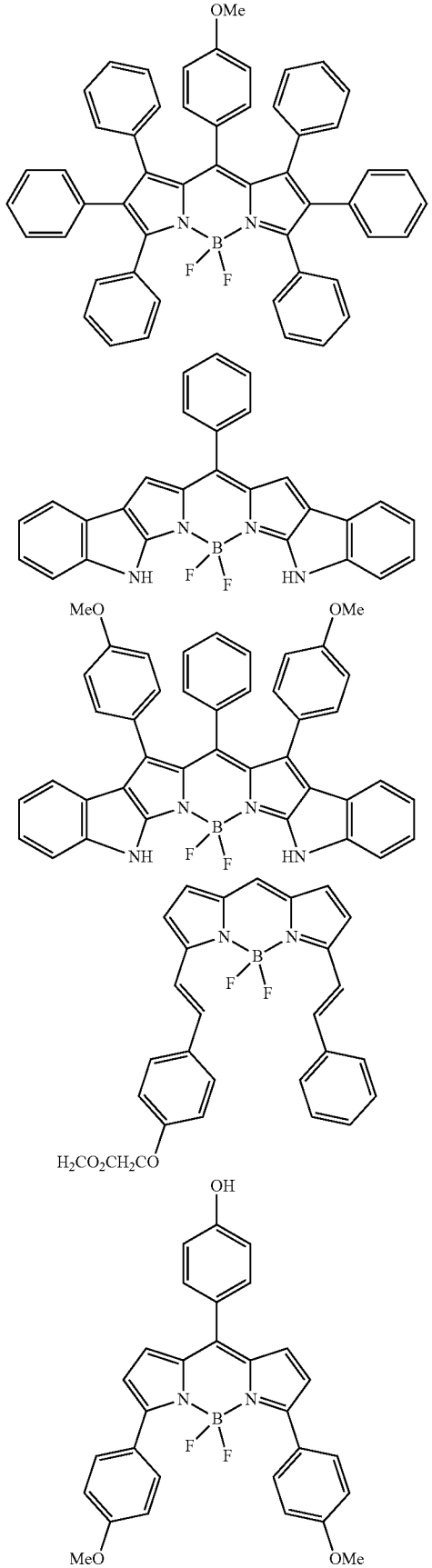

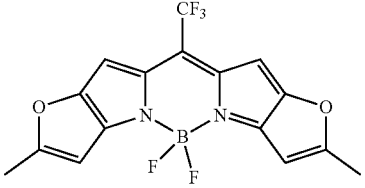

The fluorescent substance illustrated above has a light emission peak's full width at half maximum of 40 nm or less in a solution state, and has a light emission peak's full width at half maximum of approximately 50 nm in a film state.

The content of the organic fluorescent substance may be 0.005 parts by weight to 2 parts by weight based on 100 parts by weight of the resin matrix included in the color conversion layer.

According to an exemplary embodiment of the present application, the color conversion layer may have a thickness of 1 to 200 μm, for example, 2 to 50 μm.

The color conversion layer may be manufactured by using a method including: coating a resin solution, in which an organic fluorescent substance is dissolved or dispersed, onto a base material; and drying the resin solution coated onto the base material, or a method including extruding an organic fluorescent substance together with a resin.

When the fluorescent substance is an organic fluorescent substance, the organic fluorescent substance is uniformly distributed in the resin solution because the organic fluorescent substance is dissolved in the resin solution, and as a result, there is no need for a separate dispersion process.

An additive may be added into the resin solution, if necessary, and for example, a light diffuser such as silica, titania, zirconia, and alumina powders may be added. Further, a dispersant may also be additionally added in order to stably disperse light diffusion particles.

The method for preparing the resin solution in which the organic fluorescent substance is dissolved or dispersed is not particularly limited as long as the resin solution is in a state where the organic fluorescent substance and the resin are dissolved or dispersed in the solution.

According to an example, the resin solution in which the organic fluorescent substance is dissolved may be prepared by a method of preparing a first solution by dissolving an organic fluorescent substance in a solvent, preparing a second solution by dissolving a resin in a solvent, and mixing the first solution and the second solution. When the first solution and the second solution are mixed, it is preferred to uniformly mix the solutions. However, the method is not limited thereto, and it is possible to use a method of simultaneously adding and dissolving an organic fluorescent substance and a resin in a solvent, a method of dissolving an organic fluorescent substance in a solvent and subsequently adding and dissolving a resin, a method of dissolving a resin in a solvent and subsequently adding and dissolving an organic fluorescent substance, and the like.

As the resin included in the solution, it is possible to use the above-described resin matrix material, a monomer which is curable by the resin matrix material, or a mixture thereof. Examples of the monomer which is curable by the resin matrix include a (meth)acrylic monomer, and the monomer may be formed as a resin matrix material by UV curing. When a curable monomer is used as described above, an initiator required for curing may be further added, if necessary.

The solvent is not particularly limited, and is not particularly limited as long as the solvent may be removed by a subsequent drying while not adversely affecting the coating process. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, cyclohexanone, propylene glycol methylethyl acetate (PG-MEA), dioxane, dimethylformamide (DMF), dimethylacetamide (DMAc), dimethylsulfoxide (DMSO), N-methyl-pyrrolidone (NMP), and the like, and one type or a mixture of two or more types may be used. When the first solution and the second solution are used, the solvents included in the solutions may also be the same as or different from each other. Even when different solvents are used in the first solution and the second solution, it is preferred that these solvents have compatibility so as to be mixed with each other.

A process of coating the resin solution, in which the organic fluorescent substance is dissolved, onto a base material may use a roll-to-roll process. For example, the process may be performed by a process of unwinding a base material from a roll on which the base material is wound, coating a resin solution, in which the organic fluorescent substance is dissolved, onto one surface of the base material, drying the resin solution, and then winding the base material again on the roll. When the roll-to-roll process is used, it is preferred that the viscosity of the resin solution is determined within a range in which the process may be implemented, and the viscosity may be determined within a range of, for example, 200 to 2,000 cps.

As the coating method, various publicly-known methods may be used, and for example, a die coater may also be used, and it is also possible to use various bar-coating methods such as a screen coater, a comma coater, and a reverse comma coater.

After the coating, a drying process is performed. The drying process may be performed under conditions required for removing the solvent. For example, a color conversion layer including a fluorescent substance having desired thickness and concentration may be obtained on a base material by carrying out the drying in an oven located close to a coater under a condition to sufficiently evaporate a solvent, in a direction of the base material progressing during the coating process.

When the color shift compensation polymer is included in a color conversion layer, the color shift compensation polymer may be added into a composition used when the above-described color conversion layer is manufactured.

The color shift compensation layer may be manufactured by coating a composition including the color shift compensation polymer on at least one surface of the color conversion layer, and drying or curing the composition, if necessary.

The color shift compensation layer may be manufactured by a method of coating the composition onto a transparent base material, a solution casting method, an extrusion and stretching method, and the like. In this case, when an extrusion molding is performed as a method of forming the color shift compensation layer, a resin such as polycarbonate (PC), polyethylene terephthalate (PET), polymethylmethacrylate (PMMA), and styrene acrylonitrile (SAN) and a color shift compensation polymer may be used together.

In the present application, a color shift correction film may mean the color shift compensation layer, and may be manufactured by the same method as the method of manufacturing a color shift compensation layer.

When the monomer which is curable by the resin matrix is used as a resin included in the solution, curing, for example, UV curing may be performed before the drying or simultaneously with the drying.

When the organic fluorescent substance is filmed by being extruded with a resin, an extrusion method known in the art may be used, and for example, a color conversion layer may be manufactured by extruding a fluorescent substance with a resin such as a polycarbonate (PC)-based resin, a poly (meth)acrylic resin, and a styrene-acrylonitrile (SAN)-based resin.

Another exemplary embodiment of the present application provides a backlight unit including the above-described color conversion film. The backlight unit may have a backlight unit configuration known in the art, except that the backlight unit includes the color conversion film. For example, FIGS. 5 and 6 illustrate an example of the backlight unit. According to FIG. 5, the color conversion film according to the above-described exemplary embodiments is disposed between a light guide plate and a reflecting plate. According to FIG. 6, the color conversion film according to the above-described exemplary embodiments is disposed on a surface opposite to a surface of the light guide plate facing the reflecting plate. FIGS. 5 and 6 illustrate a configuration including a light source and a reflecting plate surrounding the light source, but the configuration is not limited to such a structure, and may be modified depending on the structure of the backlight unit known in the art. Further, as a light source, a direct type as well as a side chain type may be used, and a reflecting plate or a reflecting layer may be omitted or replaced with other configurations, if necessary, and an additional film, for example, a light diffusion film, a light collecting film, a brightness enhancement film, and the like may be additionally disposed, if necessary.

In the configuration of the backlight unit as illustrated in FIGS. 5 and 6, a scattering pattern may be disposed on an upper or lower surface of the light guide plate, if necessary. FIG. 7 illustrates an example in which a scattering pattern is disposed on a lower surface of the light guide plate, that is, a surface facing the reflecting plate, and FIG. 8 illustrates an example in which a scattering pattern is disposed on an upper surface of the light guide plate, that is, a surface opposite to a surface facing the reflecting plate. Light incident into the light guide plate has a non-uniform light distribution caused by repeated optical processes such as reflection, total reflection, refraction, and transmission, and the scattering pattern may be used for inducing the non-uniform light distribution to uniform brightness.

According to still another exemplary embodiment of the present application, a display device including the above-described backlight unit is applied. The display device is not particularly limited as long as the device includes the above-described backlight unit as a constituent element. For example, the display device includes a display module and a backlight unit. FIGS. 9 and 10 illustrate a structure of the display device. FIG. 9 illustrates a case where a color conversion film is provided between a light guide plate and a reflecting plate, and FIG. 10 illustrates a case where a color conversion film is provided on a surface opposite to a surface of a light guide plate facing a reflecting plate. However, the structure is not limited thereto, and an additional film, for example, a light diffusion film, a light collecting film, and a brightness enhancement film, and the like may be further disposed between the display module and the backlight unit, if necessary.

MODE FOR INVENTION

Hereinafter, the present invention will be described in more detail through Examples. However, the following Examples are only to exemplify the present invention, but not to limit the scope of the present invention.

Example

A polymer solution was prepared by dissolving a green fluorescent substance having the following structure in a polystyrene solution in DMF. In this case, 1 part by weight of the fluorescent substance based on 100 parts by weight of polystyrene was used. The solution had a solid content of 20 wt % and a viscosity of 200 cps. The solution was coated onto a PET base material, and then dried, thereby manufacturing a first color conversion layer (green color conversion layer) in the form of a film.

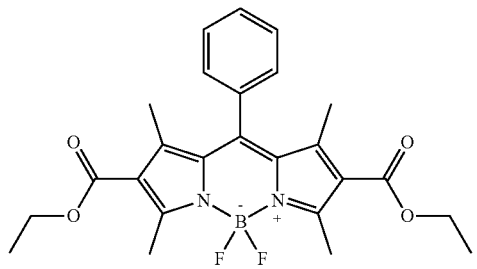

A second color conversion layer (red color conversion layer) was manufactured in the form of a film in the same manner as the green color conversion film, except that the following red fluorescent substance was used.

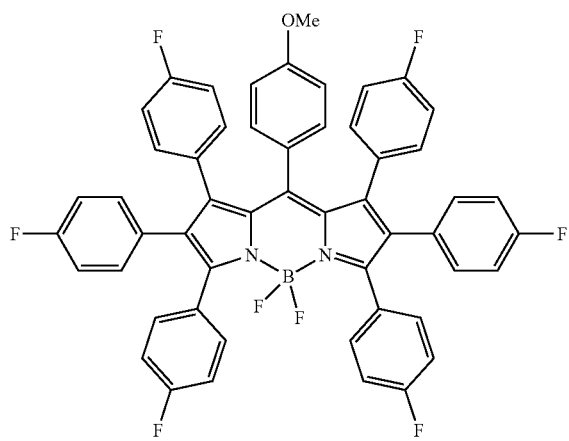

The first color conversion layer and the second color conversion layer were stacked as both surfaces by a non-carrier film (NCF)-type adhesive, thereby manufacturing a third color conversion layer in the form of a film.

A spectrum of white light evaluated by applying the color conversion film to a backlight unit including a blue light source in an edge lit system is illustrated in FIG. 11.

A DMF solution with a solid content of 20 wt % was prepared by mixing a polyurethane resin, which is composed of methylene diphenyl diisocyanate (MDI) and an ester-type polyol, with a PMMA resin at a ratio of 80:20 parts by weight, and then coated to have a thickness of 20 μm on a PET film and dried, thereby manufacturing a color shift compensation layer in the form of a film.

A light guide plate, the third color conversion layer manufactured above, two prism films, and an APF film were stacked, and the color shift compensation layer was stacked on the upper portion thereof, thereby manufacturing a backlight unit. A light emission spectrum of a backlight unit was measured, and in a state where the backlight unit was continuously driven in an oven at 60° C., light characteristic changes of the color conversion layer and the color shift compensation layer were measured according to storage time.

Comparative Example

A backlight unit was manufactured in the same manner as in the Example, except that the color shift compensation layer was not applied to the Example.

In the case of the Comparative Example in which the color shift compensation layer was not applied when durability was evaluated at high temperature, it can be seen that the green light and the red light were decreased by degradation of the organic fluorescent substance, and the like, and as the blue light was increased, the color difference as compared to the initial phase was continuously widened (the Comparative Example, FIG. 12, and the following Table 1). In the present specification, the color difference means a color difference in a specific time (t), and means Equation $[sqrt((Wx(t)-Wx(Initial\ phase))^2+(Wy(t)-Wy(Initial\ phase))^2)]$.

TABLE 1

| Time (hr) | Color difference change |
| --- | --- |
| 0 | 0.000 |
| 118 | 0.011 |
| 235 | 0.018 |
| 353 | 0.019 |
| 647 | 0.039 |
| 765 | 0.044 |
| 1000 | 0.054 |

In contrast, in the Example to which the color shift compensation layer was applied, the width of the color difference change according to the time is significantly reduced as in FIG. 13 and Table 2. Further, the color difference change at 1,000 hours was 0.012, indicating a very excellent result.

TABLE 2

| Time (hr) | Color difference change |
| --- | --- |
| 0 | 0.000 |
| 118 | 0.002 |
| 235 | 0.003 |
| 353 | 0.003 |
| 647 | 0.008 |
| 765 | 0.009 |
| 1000 | 0.012 |

The invention claimed is:
1. A color conversion film comprising:
a color conversion layer which comprises:
a resin matrix comprising a polymethylmethacrylate (PMMA), a polycarbonate (PC)-based material, a polystyrene (PS)-based material, a polyarylene (PAR)-based material, a polyurethane (TPU)-based material, a styrene-acrylonitrile (SAN)-based material, a polyvinylidene fluoride (PVDF)-based material, a modified-polyvinylidene fluoride (modified-PVDF)-based material, a styrene-ethylene-butylene-styrene (SEBS)-based material, or a hydrogenated styrene-ethylene-butylene-styrene (hydrogenated SEBS)-based material;
an organic fluorescent substance that is dispersed in the resin matrix and emits light with a wavelength different from that of irradiated light when irradiated with light including a wavelength of 450 nm; and
a color shift compensation polymer comprising a urethane resin including an aromatic ring from toluene diisocyanate (TDI), methylene diphenyl diisocyanate (MDI), xylene diisocyanate (XDI) metatetramethylxylene diisocyanate (TMXDI), naphthalene 1,5-diisocyanate (NDI), hydrogenated xylene diisocyanate (HXDI), p-phenylene diisocyanate (PPDI), or 4,4'-dibenzyl diisocyanate (DBDI), which allows a color difference change of white light emitted to be 0.05 or less when an entire surface of the color conversion film is irradiated with blue light having a luminance of 600 nit at 60° C. for 1,000 hours, in the color conversion layer.

2. The color conversion film of claim 1, wherein the blue light is light in which blue light emitted from a light source is converted into a surface light source through a stack structure of a backlight unit comprising a light guide plate, a light collecting film, and a brightness enhancement film.

3. The color conversion film of claim 1, wherein the blue light has a light emission peak at 450 nm and a full width at half maximum of 30 nm or less.

4. The color conversion film of claim 1, further comprising:
a transparent film disposed on at least one surface thereof.

5. The color conversion film of claim 1, wherein the content of the color shift compensation polymer is 1 to 50 wt % based on a total weight of the color conversion layer.

6. The color conversion film of claim 1, wherein the color conversion layer comprises one or two or more of an organic fluorescent substance of the following Chemical Formula 1 and an organic fluorescent substance of the following Chemical Formula 2:

[Chemical Formula 1]

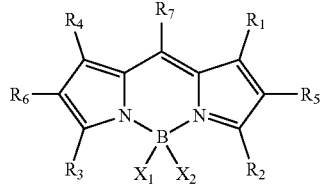

in Chemical Formula 1,
$X_1$ and $X_2$ are the same as or different from each other, and are each independently a fluorine group or an alkoxy group,
$R_1$ to $R_4$ are the same as or different from each other, and are each independently hydrogen, a halogen group, an alkyl group, an alkoxy group, an alkyl group substituted with a carboxyl group, an aryl group unsubstituted or substituted with an alkoxy group, —COOR, or an alkyl group substituted with —COOR, and R is an alkyl group,
$R_5$ and $R_6$ are the same as or different from each other, and are each independently hydrogen, a cyano group, a nitro group, an alkyl group, an alkyl group substituted with a carboxyl group, —SO$_3$Na, or an aryl group unsubstituted or substituted with an arylalkynyl group, $R_1$ and $R_5$ are optionally linked to each other to form a substituted or unsubstituted hydrocarbon ring or a substituted or unsubstituted hetero ring, and $R_4$ and $R_6$ are optionally linked to each other to form a substituted or unsubstituted hydrocarbon ring or a substituted or unsubstituted hetero ring, and
$R_7$ is hydrogen; an alkyl group; a haloalkyl group; or an aryl group unsubstituted or substituted with a halogen group, an alkyl group, an alkoxy group, an aryl group or an alkylaryl group,

[Chemical Formula 2]

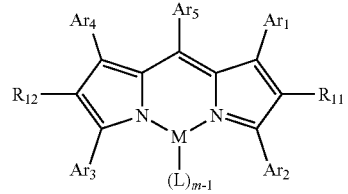

in Chemical Formula 2,
R11, R12, and L are the same as or different from each other, and are each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heterocyclic group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group, or a siloxanyl group, or are linked to an adjacent substituent to form a substituted or unsubstituted aromatic or aliphatic hydrocarbon or hetero ring,
M is a m-valent metal, and is boron, berylium, magnesium, chromium, iron, nickel, copper, zinc or platinum, and
Ar1 to Ar5 are the same as or different from each other, and are each independently hydrogen; an alkyl group; a haloalkyl group; an alkylaryl group; an amine group; an arylalkenyl group unsubstituted or substituted with an alkoxy group; or an aryl group unsubstituted or substituted with a hydroxy group, an alkyl group or an alkoxy group.

7. A backlight unit comprising the color conversion film according to claim 1.

8. A display device comprising the backlight unit according to claim 7.

9. A color conversion film comprising:
a color conversion layer which comprises a resin matrix, and an organic fluorescent substance that is dispersed in the resin matrix and emits light with a wavelength different from that of irradiated light when irradiated with light including a wavelength of 450 nm; and
an additional layer disposed on at least one surface of the color conversion layer and consisting of:
a resin selected from among polycarbonate (PC), polyethylene terephthalate (PET), polymethylmethacrylate (PMMA), and styrene acrylonitrile (SAN); and
a color shift compensation polymer, which allows a color difference change of white light emitted to be 0.05 or less when an entire surface of the color conversion film is irradiated with blue light having a luminance of 600 nit at 60° C. for 1,000 hours, in an additional layer disposed on at least one surface of the color conversion layer, and wherein the color shift compensation polymer comprises a urethane resin including an aromatic ring from toluene diisocyanate (TDI), methylene diphenyl diisocyanate (MDI), xylene diisocyanate (XDI) metatetramethylxylene diisocyanate (TMXDI), naphthalene 1,5-diisocyanate (NDI), hydrogenated xylene diisocyanate (HXDI), p-phenylene diisocyanate (PPDI), or 4,4'-dibenzyl diisocyanate (DBDI).

10. The color conversion film of claim 9, wherein the color shift compensation polymer is comprised in an amount of 10 to 100 wt % based on a total weight of the additional layer.

11. The color conversion film of claim 9, wherein the blue light is light in which blue light emitted from a light source is converted into a surface light source through a stack structure of a backlight unit comprising a light guide plate, a light collecting film, and a brightness enhancement film.

12. The color conversion film of claim 9, wherein the blue light has a light emission peak at 450 nm and a full width at half maximum of 30 nm or less.

13. The color conversion film of claim 9, further comprising:
    a transparent film disposed on at least one surface thereof.

14. The color conversion film of claim 9, wherein the color conversion layer comprises one or two or more of an organic fluorescent substance of the following Chemical Formula 1 and an organic fluorescent substance of the following Chemical Formula 2:

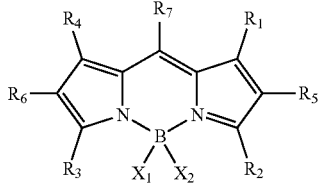

[Chemical Formula 1]

in Chemical Formula 1, $X_1$ and $X_2$ are the same as or different from each other, and are each independently a fluorine group or an alkoxy group, $R_1$ to $R_4$ are the same as or different from each other, and are each independently hydrogen, a halogen group, an alkyl group, an alkoxy group, an alkyl group substituted with a carboxyl group, an aryl group unsubstituted or substituted with an alkoxy group, —COOR, or an alkyl group substituted with —COOR, and R is an alkyl group, $R_5$ and $R_6$ are the same as or different from each other, and are each independently hydrogen, a cyano group, a nitro group, an alkyl group, an alkyl group substituted with a carboxyl group, —SO$_3$Na, or an aryl group unsubstituted or substituted with an arylalkynyl group, $R_1$ and $R_5$ are optionally linked to each other to form a substituted or unsubstituted hydrocarbon ring or a substituted or unsubstituted hetero ring, and $R_4$ and $R_6$ are optionally linked to each other to form a substituted or unsubstituted hydrocarbon ring or a substituted or unsubstituted hetero ring, and $R_7$ is hydrogen; an alkyl group; a haloalkyl group; or an aryl group unsubstituted or substituted with a halogen group, an alkyl group, an alkoxy group, an aryl group or an alkylaryl group,

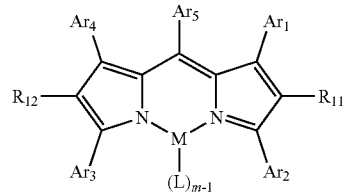

[Chemical Formula 2]

in Chemical Formula 2,

R11, R12, and L are the same as or different from each other, and are each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heterocyclic group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group, or a siloxanyl group, or are linked to an adjacent substituent to form a substituted or unsubstituted aromatic or aliphatic hydrocarbon or hetero ring, M is a m-valent metal, and is boron, berylium, magnesium, chromium, iron, nickel, copper, zinc or platinum, and Ar1 to Ar5 are the same as or different from each other, and are each independently hydrogen; an alkyl group; a haloalkyl group; an alkylaryl group; an amine group; an arylalkenyl group unsubstituted or substituted with an alkoxy group; or an aryl group unsubstituted or substituted with a hydroxy group, an alkyl group or an alkoxy group.

15. A backlight unit comprising the color conversion film according to claim 9.

16. A display device comprising the backlight unit according to claim 15.

* * * * *